United States Patent
Stahl et al.

(10) Patent No.: US 10,259,300 B2
(45) Date of Patent: Apr. 16, 2019

(54) LATERAL TAILGATE SUPPORT FOR A MOTOR VEHICLE

(71) Applicant: Dr. Ing. h.c. F. Porsche Aktiengesellschaft, Stuttgart (DE)

(72) Inventors: Anika Stahl, Heilbronn (DE); Marco Schmidt, Walheim (DE); Andreas Koenig, Tamm (DE); Steffen Buchwald, Ingersheim (DE); Matthias Pfaeffle, Wuestenrot (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 158 days.

(21) Appl. No.: 15/445,064

(22) Filed: Feb. 28, 2017

(65) Prior Publication Data

US 2017/0334273 A1    Nov. 23, 2017

(30) Foreign Application Priority Data

May 20, 2016  (DE) .......... 10 2016 109 264

(51) Int. Cl.
| | |
|---|---|
| *B60P 1/267* | (2006.01) |
| *B60J 5/10* | (2006.01) |
| *B60J 10/273* | (2016.01) |
| *B60Q 1/30* | (2006.01) |

(52) U.S. Cl.
CPC .......... *B60J 5/107* (2013.01); *B60J 10/273* (2016.02); *B60Q 1/30* (2013.01)

(58) Field of Classification Search
CPC .......... B60J 5/107; B60J 10/237; B60Q 1/30
See application file for complete search history.

(56) References Cited

U.S. PATENT DOCUMENTS

2009/0289475 A1 * 11/2009 Walter .............. B62D 25/087
                                                        296/203.01

FOREIGN PATENT DOCUMENTS

| | | | |
|---|---|---|---|
| CN | 202627773 U | 12/2012 | |
| CN | 202627774 U | 12/2012 | |
| CN | 202788400 U | 3/2013 | |
| CN | 204343868 U | 5/2015 | |
| CN | 105090310 | 11/2015 | |
| DE | 43 07 454 | 4/1994 | |
| DE | 196 44 236 | 4/1998 | |
| DE | 198 16 027 | 10/1999 | |
| DE | 19835998 A1 * | 2/2000 | ........... B21B 37/26 |
| DE | 10337613 A1 | 5/2005 | |
| DE | 10 2009 012 059 | 9/2010 | |
| JP | S62145857 U | 9/1987 | |
| JP | 2002-29261 | 1/2002 | |
| JP | 2008080844 A | 4/2008 | |
| JP | 2010-228675 | 10/2010 | |

OTHER PUBLICATIONS

Korean Notice of Preliminary Rejection dated August 16, 2018.
Chinese Office Action dated Jul. 13, 2018.
German Search Report dated Dec. 13, 2016.

* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A tailgate support is arranged in a sealing channel between an inner panel of the lid bodyshell and a lateral covering of the rear lights.

9 Claims, 10 Drawing Sheets

LATERAL TAILGATE SUPPORT FOR A MOTOR VEHICLE

CROSS REFERENCE TO RELATED APPLICATION

This application claims priority under 35 USC 119 to German Patent Appl. No. 10 2016 109 264.9 filed on May 20, 2016, the entire disclosure of which is incorporated herein by reference.

BACKGROUND

1. Field of the Invention

The invention relates to a lateral tailgate support for a motor vehicle, a corresponding tailgate, a corresponding motor vehicle and a corresponding method for producing a motor vehicle.

2. Related Art

Prior art passenger vehicles have a luggage compartment for conveying a load. Most vehicles have a front engine and have a luggage compartment in the rear region. Station wagons, a sports utility vehicles (SUV) and other vehicles with a hatchback have a tailgate fastened via the rear window to provide access to the luggage compartment and an interior compartment.

DE 196 44 236 C2 provides a stop buffer for positionally fixing the front hood. The stop buffer has a buffer pin and an elongate receiving profile portion extending in the longitudinal direction of the vehicle.

DE 43 07 454 C1 describes a locking device for an outer pivoting lid of a motor vehicle. The pivoting lid, in its closed position, extends with support via a buffer in a manner flush with the surface of the wall that is fixed on the body. The buffer is designed as a rotatable ring having a thickness that is variable over the circumference of the ring.

JP 2010-228675 also describes a buffer for a hood on the motor vehicle. If the engaging impact force exceeds a certain value, the external thread of the screw element can be deformed plastically to absorb the impact force.

JP 2002029261 A also describes a stop buffer for a closable component.

CN 105090310 A describes a buffer for the front hood of a motor vehicle that is adjustable in the vehicle vertical direction via a thread.

SUMMARY

The invention provides a lateral tailgate support for a motor vehicle that is fit into the sealing channel between the inner panel of the lid bodyshell and the lateral covering of the rear lights of the vehicle, and that lies flat against the covering.

The adjustability of the Y contact surface can be realized either by means of a buffer that can be displaced by lateral rails and secured with a screw, or by displacement of the housing because of elongated holes that are present. The adjustability normally to the inlet direction of the rear lid is made possible via a Z buffer with the aid of a thread.

An exemplary embodiment of the invention is illustrated in the drawings and is described in more detail below.

DETAILED DESCRIPTION

Figure 1:
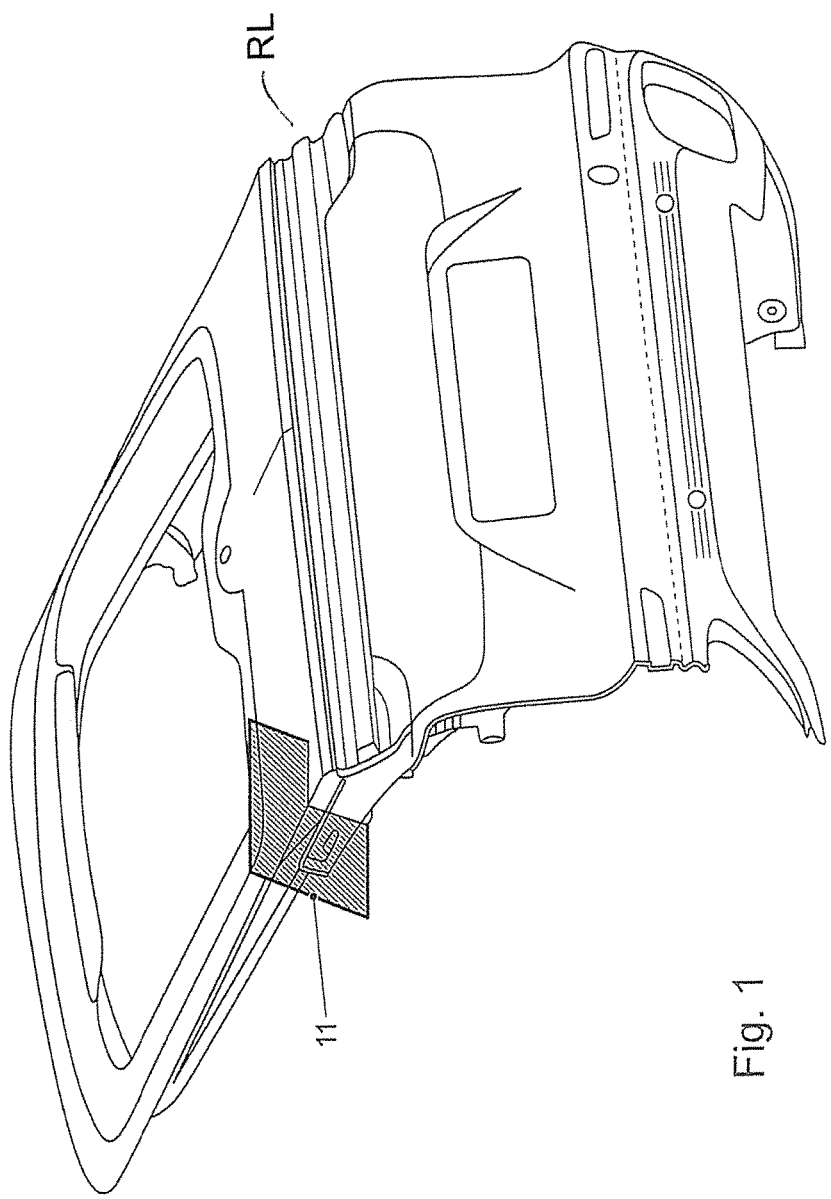
FIG. 1 is the view of the rear end of a motor vehicle.
Figure 2:
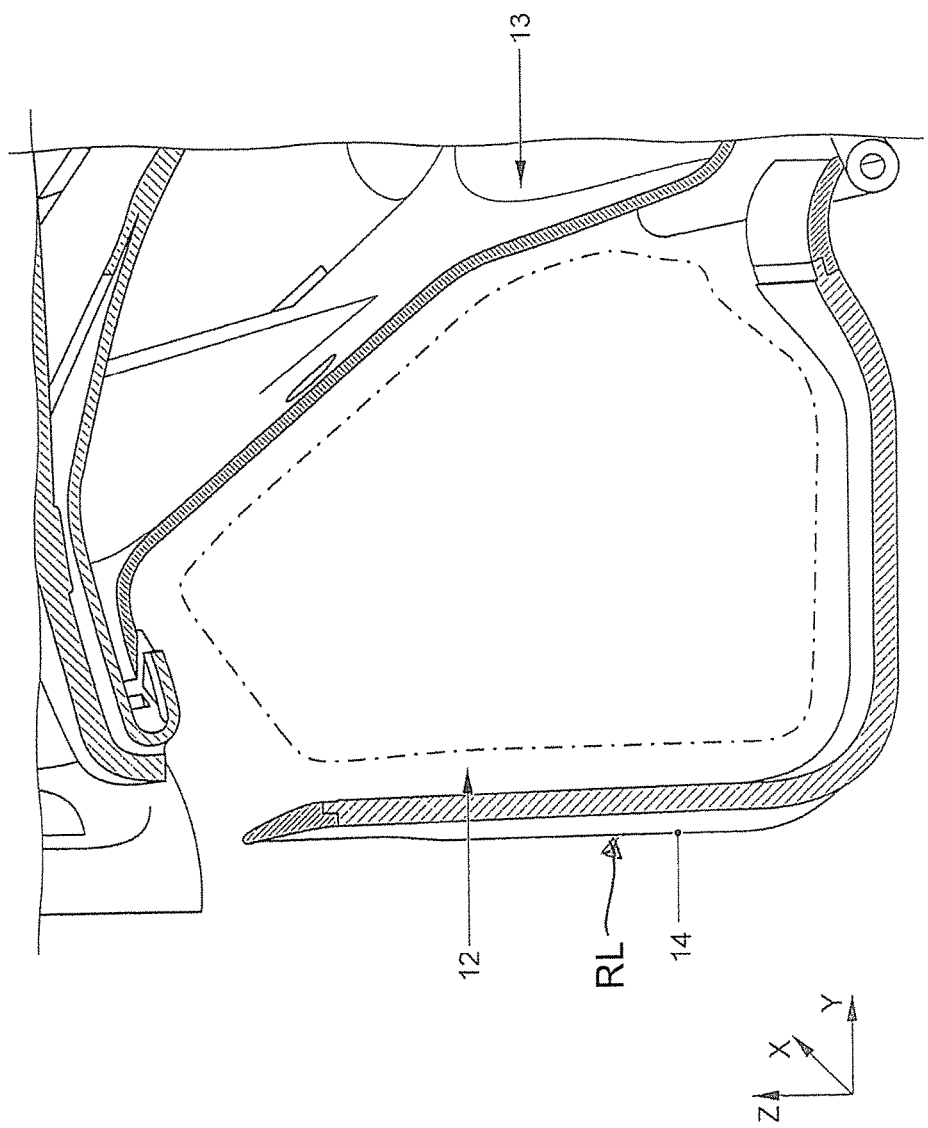
FIG. 2 is a section in the plane 11 according to FIG. 1.

FIGS. 1 and 2 collectively illustrate the construction space of a lateral tailgate support for a motor vehicle according to the invention. The designated installation site is in a sealing channel 12 between the inner panel 13 of the lid bodyshell and the lateral covering 14 of the rear lights RL that preferably is made of plastic.

Figure 3:
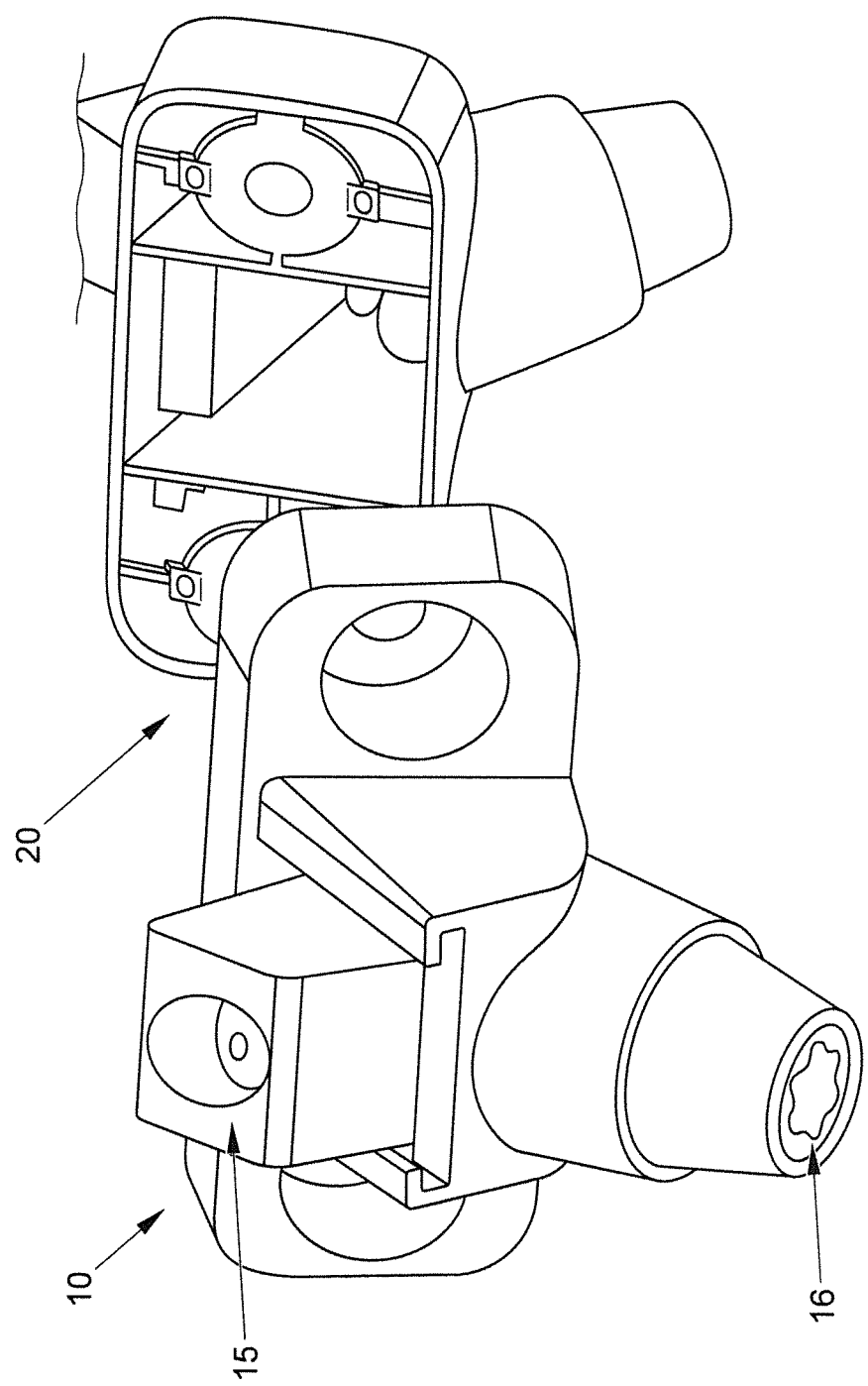
FIG. 3 is the view of a first embodiment of two supports.

FIG. 3 illustrates the tailgate supports 10, 20 that are provided on both sides of the rear end of FIG. 1. More particularly, FIG. 3 shows the left tailgate support 10 in the designated direction of travel. The two supports have a Y contact surface 15 and a Z contact surface 16.

Figure 4:
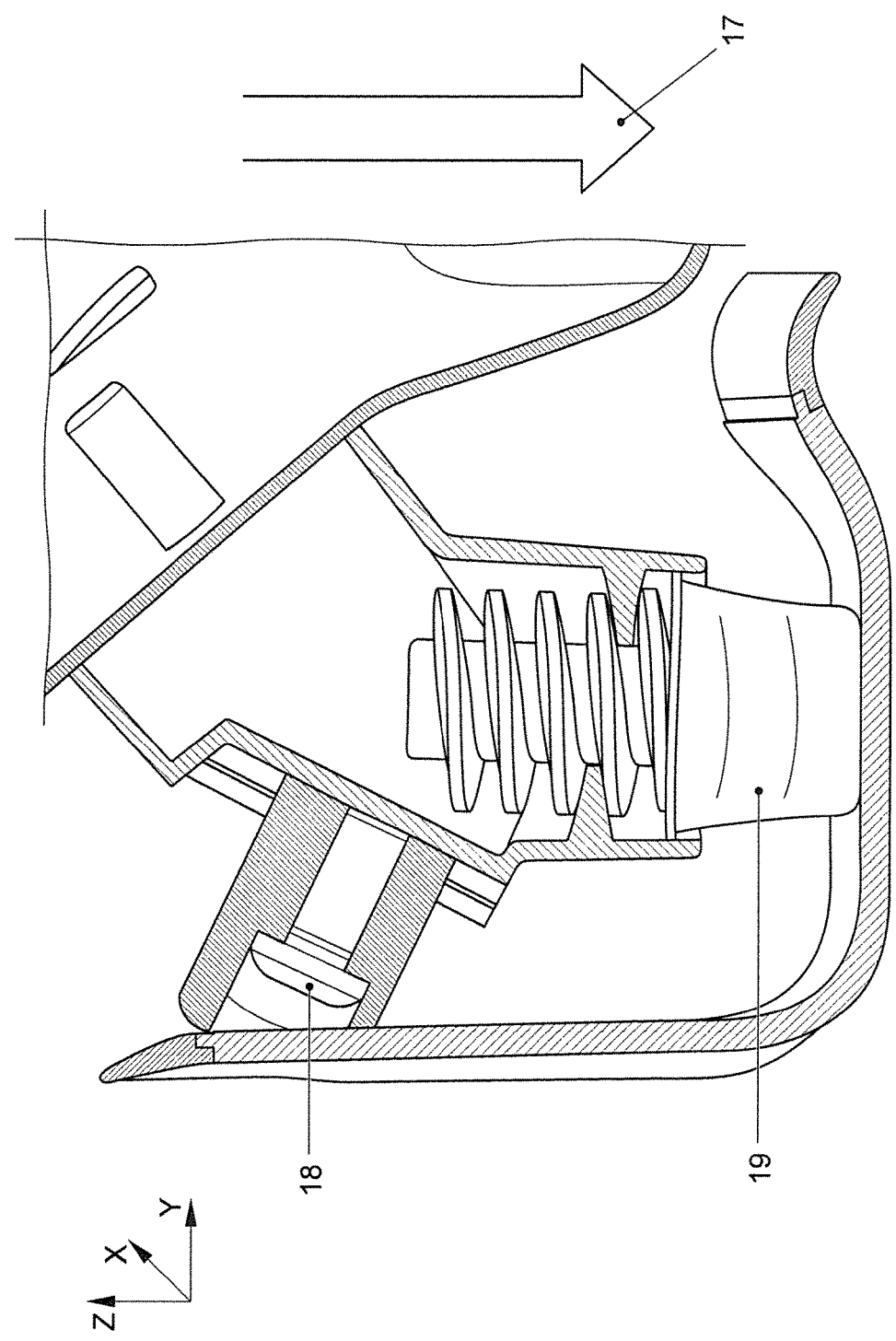
FIG. 4 is a section, corresponding to FIG. 2, of the first embodiment of a support fitted into the sealing channel of the rear end.

FIG. 4 illustrates the construction space of the tailgate support 10. It becomes clear in this illustration that the pitching axis Y of the motor vehicle runs transverse to the Y contact surface 15, and the yaw axis Z of the motor vehicle runs transverse respect to the Z contact surface 16 when the tailgate support 10 is arranged in the sealing channel 12.

Figure 5:
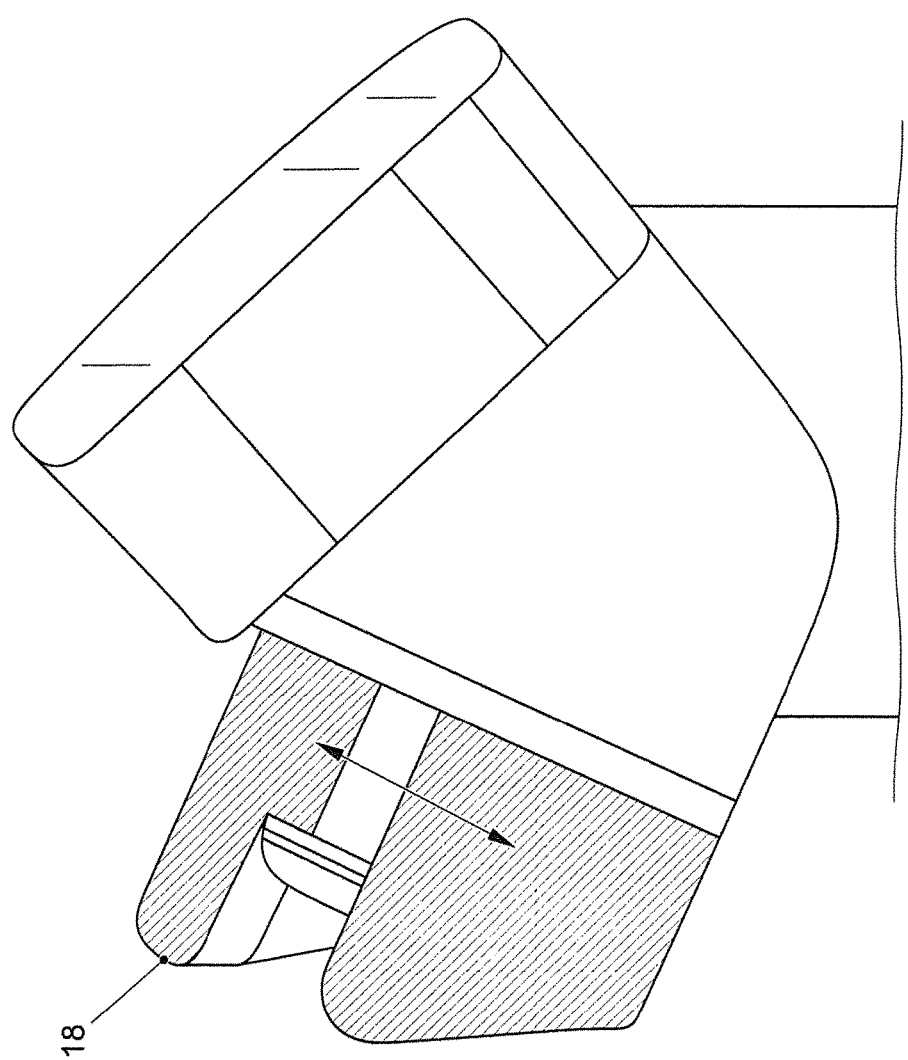
FIG. 5 is a first partial section of the support according to FIG. 4.

As shown in FIG. 5, the Y contact surface 15 is defined by a Y buffer 18 that can be displaced transversely with respect to the rolling axis X of the motor vehicle by means of a linear guide—designed here as a rail guide—of the housing, and is connected to the housing of the tailgate support 10 by a screw.

Figure 6:
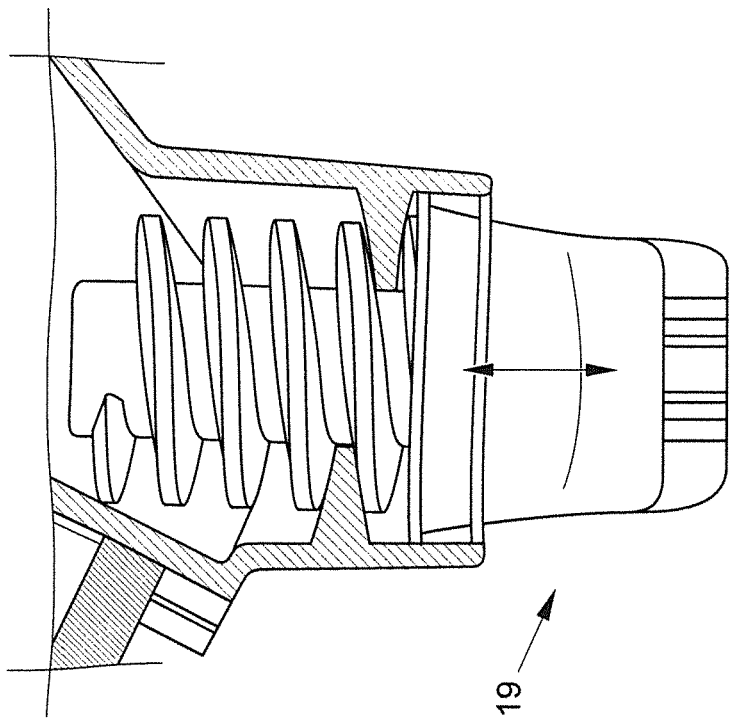
FIG. 6 is a second partial section of the support according to FIG. 4.

In a corresponding manner, a Z buffer 19, shown in detail in FIG. 6, defines the Z contact surface 16 of the tailgate support 10. The Z buffer 19 can be displaced longitudinally with respect to the yaw axis Z of the motor vehicle by means of a thread, which is designed here as a trapezoidal thread.

Figure 7:
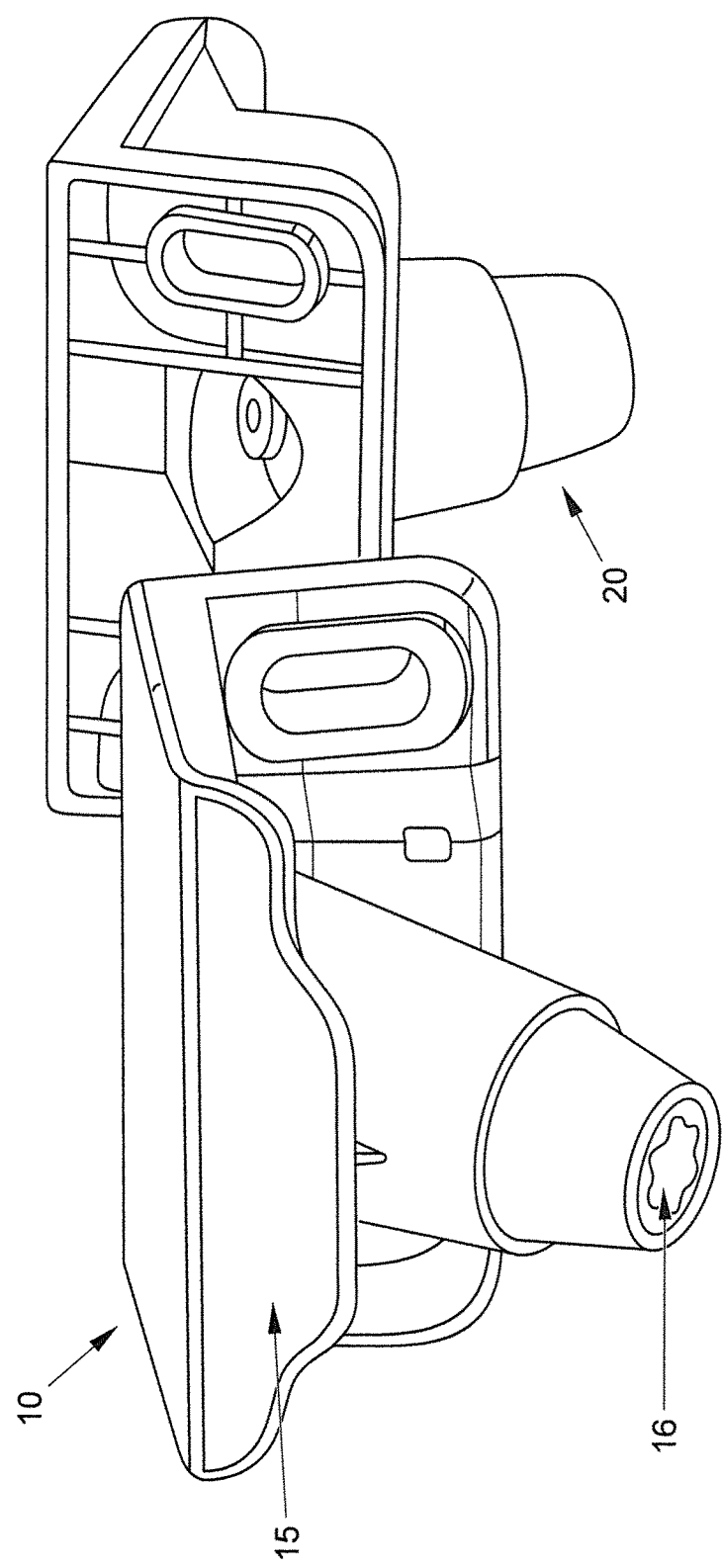
FIG. 7 is a view, corresponding to FIG. 3, of a second embodiment of two supports.
Figure 8:
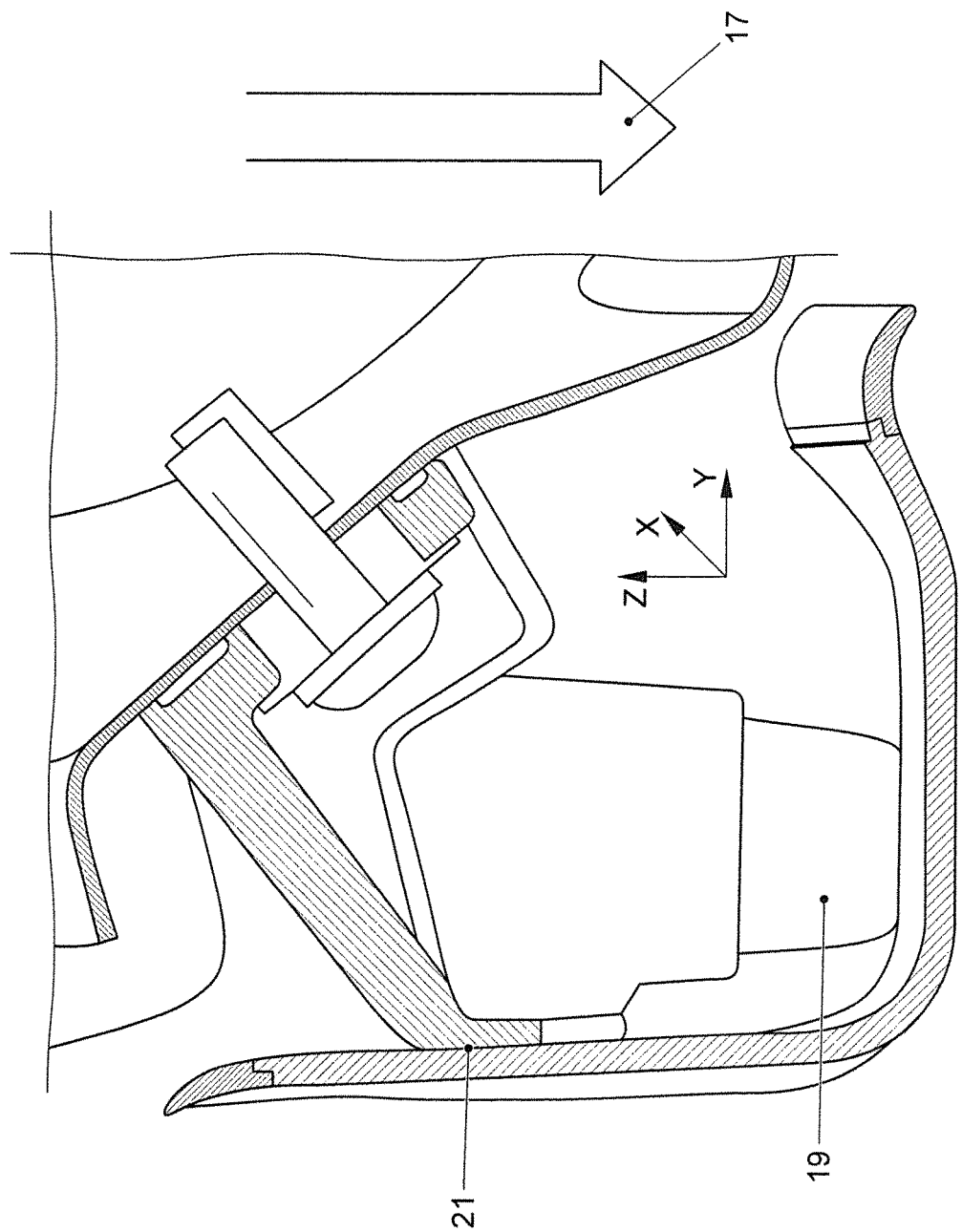
FIG. 8 is a section, corresponding to FIG. 2, of the first embodiment of a support fitted into the sealing channel of the rear end.
Figure 9:
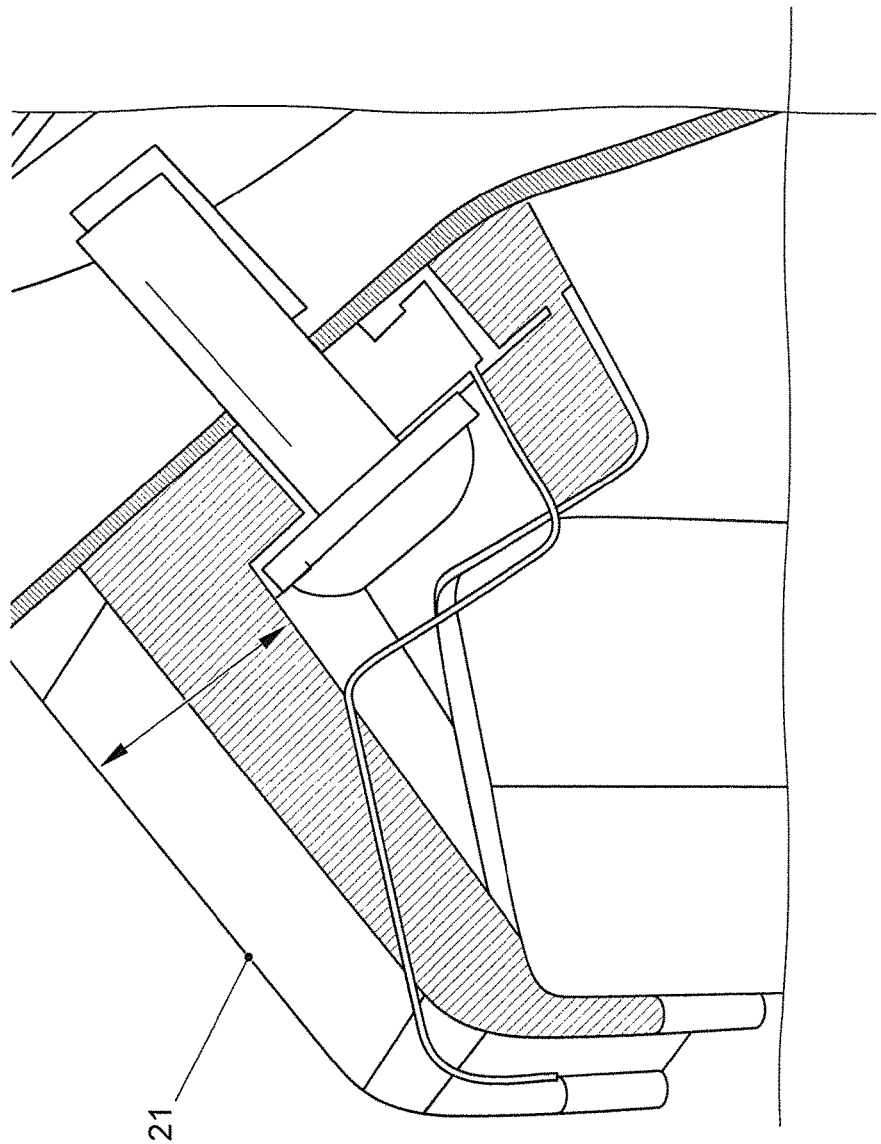
FIG. 9 is a first partial section of the support according to FIG. 8.
Figure 10:
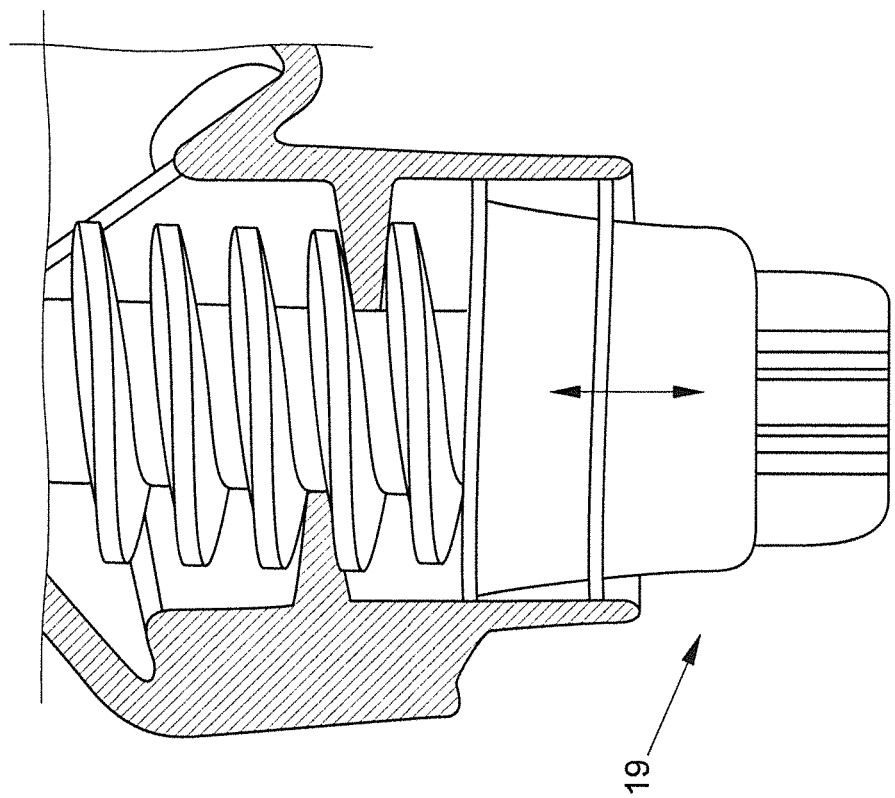
FIG. 10 is a second partial section of the support according to FIG. 8.

FIG. 7 contrasts the first embodiment of FIG. 3 with a second embodiment of the tailgate supports 10, 20. The second embodiment differs from the first embodiment primarily by having a Y contact surface 15 formed directly by the respective housing, as illustrated clearly in FIGS. 8 and 9. Instead of the separately formed Y buffer 18 of the first embodiment, the entire housing can be adjusted by being displaced along the inner panel 13—on a line defined by elongated holes provided on both sides of the Z buffer 19. However, the Z buffer 19 shown in FIG. 10 with reference to the second embodiment substantially corresponds to that of FIG. 6.

What is claimed is:

1. A lateral tailgate support for a motor vehicle with a lid bodyshell and rear lights, the tailgate support being configured to be arranged in a sealing channel between an inner panel of the lid bodyshell and a lateral covering of the rear lights, wherein the tailgate support has a Y contact surface, and the tailgate support is shaped in such a manner that a pitching axis of the motor vehicle runs transverse to the Y contact surface when the tailgate support is arranged in the sealing channel.

2. The tailgate support of claim 1, further comprising a housing and a Y buffer which has the Y contact surface, the housing having a linear guide for displacing the Y buffer transversely with respect to a rolling axis of the motor vehicle.

3. The tailgate support of claim 2, further comprising a screw that connects the Y buffer to the housing.

4. A tailgate support of claim 1, further comprising a housing that has the Y contact surface, and the housing comprises elongated holes for connecting the housing to the inner panel.

5. The tailgate support for a motor vehicle with a lid bodyshell and rear lights, the tailgate support being configured to be arranged in a sealing channel between an inner panel of the lid bodyshell and a lateral covering of the rear lights, wherein the tailgate support has a Z contact surface, and the tailgate support is shaped so that a yaw axis of the motor vehicle is transverse to the Z contact surface when the tailgate support is arranged in the sealing channel.

6. The tailgate support of claim 5, further comprising a Z buffer that has the Z contact surface, the Z buffer having a thread for displacing the Z buffer longitudinally with respect to the yaw axis.

7. A tailgate for a motor vehicle, the tailgate comprising the tailgate support of claim 1 on both sides.

8. A motor vehicle, comprising: a lid bodyshell, rear lights on both sides of the vehicle with each of the rear lights having a lateral covering made of plastic, a tailgate and tailgate supports on both of the sides of the vehicle, each of the tailgate supports being arranged in a sealing channel between an inner panel of the lid bodyshell and the lateral covering of the respective rear light, with an inlet direction of the tailgate pointing longitudinally with respect to a yaw axis of the motor vehicle.

9. A method for producing the motor vehicle of claim 8, the method comprising
    fitting the tailgate support into the sealing channel between the inner panel of the lid bodyshell and the lateral covering of the rear lights, and
    adjusting the tailgate support in such a manner that the tailgate support lies flat against the lateral covering.

\* \* \* \* \*